May 17, 1960 C. H. JONES 2,937,231

COLOR TELEVISION RECEIVER

Filed March 17, 1954

2,937,231

COLOR TELEVISION RECEIVER

Charles H. Jones, Pittsburgh, Pa., assignor to Westinghouse Electric Corporation, East Pittsburgh, Pa., a corporation of Pennsylvania Application March 17, 1954, Serial No. 416,916

2 Claims. (Cl. 178—5.4)

Figures 1, 2:
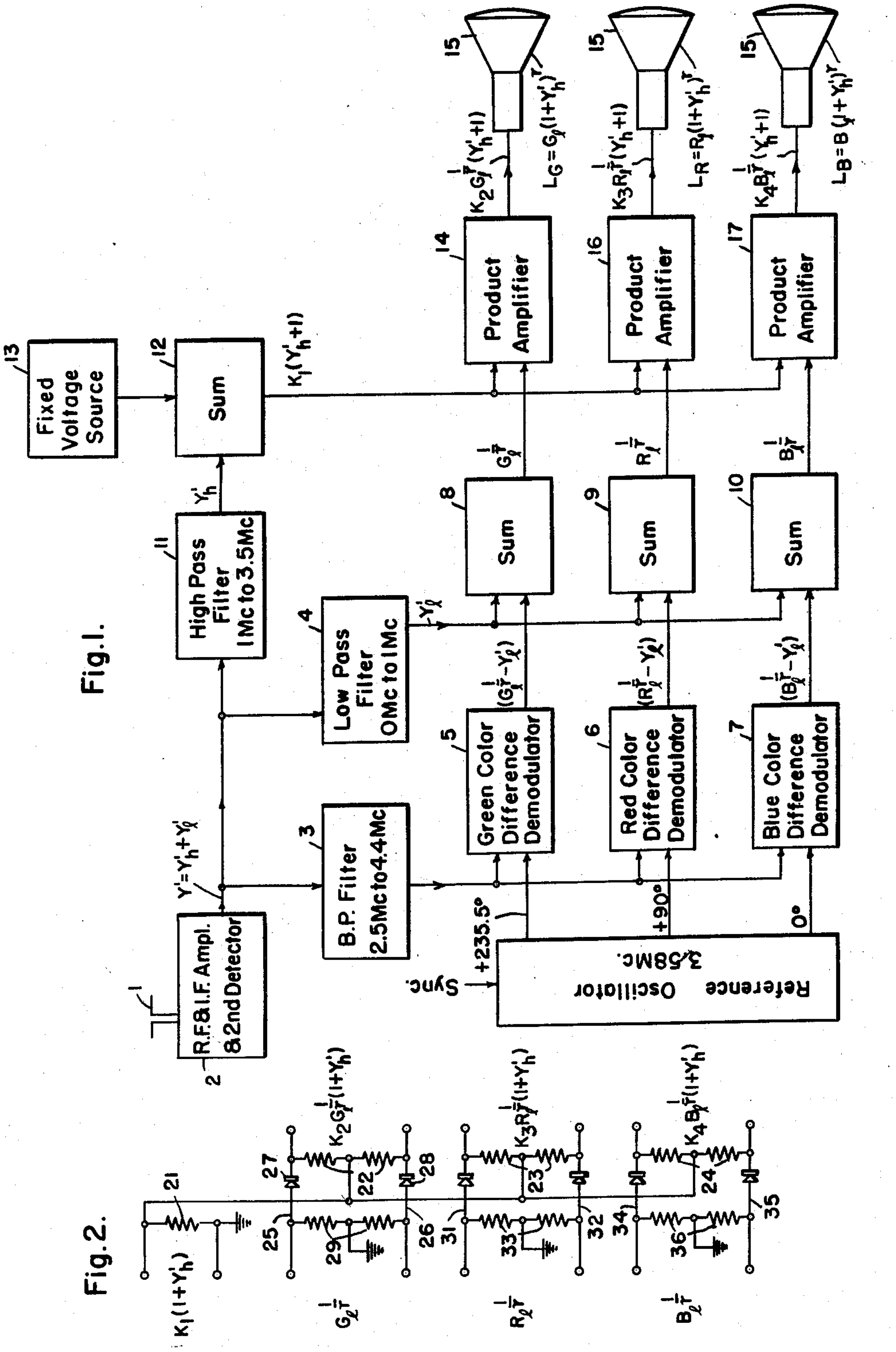

My invention relates to color television receivers and in particular relates to an improved type of receiver for the signals of the color television system recommended for standardization by the National Color Television Systems Committee (hereinafter referred to as the NTSC system) which is described in the "NTSC Color Field Specifications" submitted to the Federal Communications Commission in 1953. A description of this system believed to be sufficiently detailed for present purposes is contained in an article "Principles of NTSC National Television" by Hirsch et al. in the February 1952 number of "Electronics" published by McGraw-Hill Publishing Company, New York City.

In the above-mentioned NTSC standardization color system advantage is taken of the experimentally-established fact that the human eye is much less sensitive to fine gradations in intensity of color in pictures than it is to fine gradations of total luminous intensity by transmitting a carrier which is modulated with all frequencies of variation from thirty cycles to four megacycles in the total luminosity (regardless of color) of the picture being sent, and a subcarrier which is modulated by those color variations which occur at frequencies up to about one megacycle.

At the receiver the above-mentioned carrier and subcarrier are detected in conventional RF, IF and second detector radio receiver circuits, and the picture signals demodulated then for application to a color kinescope. A number of different ways of effecting this demodulation are known, the one of which I described to illustrate my present invention employing a local generator of this subcarrier frequency which produces three voltages respectively cophasal with the incoming subcarrier, dephased by +90° from it, and dephased by +235.5° from it. A sync burst for the subcarrier synchronization is transmitted during each horizontal retrace interval.

As described in the above-mentioned "Electronics" article, the output of the second detector divides into two channels, one of which passes a band of frequencies between 0 and 3.5 megacycles which I will call Y' representing light-intensity regardless of color and the full frequency range in the picture up to 4 megacycles, and the other of which passes a band between 2.5 and 4.0 megacycles and so includes the subcarrier which is of approximately 3.58 megacycles, and the band of its color modulators. By combining the content of this second channel with the three output phases of the local subcarrier source three signals which respectively comprise $$\left(G^{\frac{1}{\gamma}}-Y'_1\right)\quad\left(R^{\frac{1}{\gamma}}-Y'_1\right)\text{ and }\left(B^{\frac{1}{\gamma}}-Y'_1\right)$$

are derived, where G is a signal representing the green light variations (below one megacycle in frequency) in the picture, R represents the red light variations (below one megacycle in frequency), B represents the blue light variations (below one megacycle in frequency), and $Y_1$ is the portion of the picture-intensity signal Y' below 1 megacycle in frequency. The exponent gamma ($\gamma$) is a quantity of about 2 or 2.2 in value which will be explained later. We will similarly refer to the high frequency portion of the Y' signal containing frequencies from 1 to 3.5 mc. as $Y'_h$ In the systems described in the "Electronics" article the three signals described in the preceding paragraph are each added to the full frequency signal Y' to produce three outputs $$K_2\left(G^{\frac{1}{\gamma}}+Y'_h\right),\ K_3\left(R^{\frac{1}{\gamma}}+Y'_h\right)\text{ and }K_4\left(B^{\frac{1}{\gamma}}+Y'_h\right)$$

which are respectively impressed on three control electrodes for scanning beams which generate green, red and blue light from fluorescent screen elements they are incident upon.

The light emission L from phosphors is found to be proportional to the power $\gamma$ of the voltage impressed on the grid which controls the scanning beam intensity so the light-colors seen by one observing the picture screen are respectively $$L=\left(G^{\frac{1}{\gamma}}+Y'_h\right)^\gamma,\ L=\left(R^{\frac{1}{\gamma}}+Y'_h\right)^\gamma\text{ and }\left(B^{\frac{1}{\gamma}}+Y'_h\right)^\gamma$$

When there are no picture-intensity fluctuations of frequency greater than one megacycle $Y'_h=0$ and $L=G$, $L=R$ and $L=B$; thus the picture screen gives a true rendition of the color information transmitted to it; but when $Y'_h$ is not zero the rendition is only approximate, and both hue and chromaticity will be somewhat incorrect.

In accordance with my invention, I minimize the above-described defect by a system based on the assumption that the color variations of frequency above one megacycle in the respective colors as to which no information is embodied in the transmitted signal, bear the same intensity-ratios to each other as do the color variations of frequency below one megacycle. This may be accomplished by the circuit described below.

One object of my invention is accordingly to provide an improved color television receiver.

Another object of my invention is to provide an improved receiver for color television signals in which modulations of a main carrier wave conveys information as to picture luminosity variations of substantially all frequencies while modulations on a subcarrier convey information as to chromaticity variations of frequencies below one megacycle.

Another object is to provide a receiver for color television signals of the type described in the preceding paragraph in which color variations of frequency over one megacycle appear on the receiver screen which bear the same ratio to each other as to the color variations of frequencies below one megacycle.

Another object is to provide an improved receiver for color television signals of the NTSC recommended standard type.

Still another object is to provide a receiver for color television signals of the standard NTSC type in which color variations of frequencies above one megacycle have the same chromaticity hue and saturation as do color variations in the picture below one megacycle in frequency.

Other objects of my invention will become apparent upon reading the following description taken in connection with the drawings in which:

Figure 1 is a schematic diagram of a television receiver embodying the principles of my invention; and Fig. 2 is a schematic diagram of a product amplifier suited for use in the circuit of Fig. 1.

Referring in detail to the drawing, incoming signals of the NTSC standard type incident on an antenna 1 are amplified and detected by conventional RF, IF and second detector circuits 2 which are too well known to require detailed description here. The output of the second detector (i.e. Y'), passes through suitable filters into three channels; one through a band-pass filter 3 admitting frequencies from 2.5 mc. to 4 mc.; to a set of three demodulations 5, 6 and 7; a second through a low pass (0 to 1 mc.) filter 4 to three adding nets 8, 9 and 10; and a third through a high-pass (1 mc. to 3.5 mc.) filter 11 to an adding net 12. An oscillator of subcarrier (3.58 mc.) frequency is synchronized with the subcarrier generator at the transmitter by sync pulses arriving during the horizontal retrace time and impresses a voltage cophasal with said subcarrier on demodulator 7, a voltage +90° dephased therefrom on demodulator 6 and a voltage +235.5° dephased therefrom on demodulator 5. The exact phase to be used will depend on the phases and amplitude of the R, G, and B vectors and on the phase chosen for the reference subcarrier by the Federal Communication Commission. As a result of beating the output of bandpass filter 3 with the aforesaid subcarrier frequency voltages the demodulator 5 impresses an output proportional to $$\left(G_1^{\frac{1}{\gamma}}-Y'_1\right)$$

on adding net 8 (where $G_1$ is the signal representing green light intensity variations of frequency under 1 megacycle in the picture and $Y_1$ is the part of Y' varying at frequencies under one megacycle). This it will be noted is the same quantity derived by the "Electronics" article system. Demodulator 6 impresses an output proportional to $$\left(R_1^{\frac{1}{\gamma}}-Y'_1\right)$$

on adding net 9 (where $R_1$ is the signal representing red light intensity variations at frequency under one megacycle in the picture), and demodulator 7 impresses an otuput proportional to $$\left(B_1^{\frac{1}{\gamma}}-Y'_1\right)$$

on adding net 10 (where $B_1$ is the signal representing the blue light intensity variations of frequency under one megacycle in the picture). Demodulators 5, 6 and 7 thus act in my system just as do demodulators in the "Electronics" article. Adding net 8 then adds quantity $$\left(G_1^{\frac{1}{\gamma}}-Y'_1\right)$$

to the output $Y'_1$ of low pass filter 4 and produces an output $$K_2G^{\frac{1}{\gamma}}{}_1$$

Adding network 9 similarly adds quantity $$\left(R_1^{\frac{1}{\gamma}}-Y'_1\right)$$

to $Y'_1$ to produce an output $$K_3R_1^{\frac{1}{\gamma}}$$

and adding net 10 adds quantity $$\left(B_1^{\frac{1}{\gamma}}-Y'_1\right)$$

to $Y'_1$ to produce an otuput $$K_4B_1^{\frac{1}{\gamma}}$$

An alternate way to obtain $$G_1^{\frac{1}{\gamma}},\ R_1^{\frac{1}{\gamma}},\ \text{and}\ B_1^{\frac{1}{\gamma}}$$

that is well known in the art is to obtain "I" and "Q" signals from two phase sensitive detectors having quadrature 3.58 mc. reference inputs, and to matrix these two signals with $Y'_1$ to obtain the three low definition (0 to 1 mc.) color signals.

The output $Y'_h$ of high-pass filter 11 is added in an adding network 12 to the output of a voltage source 13 of fixed magnitude and carrier frequency to produce an output proportional to $(Y'_h+K_1)$. The latter output is impressed, together with the output $$K_2G_1^{\frac{1}{\gamma}}$$

from adding net 8, on the input of a product amplifier 14 which impressed on the green-emission control electrode of a kinescope system 15 on output which is proportional to the product of the quantities $$G_1^{\frac{1}{\gamma}}\ \text{and}\ K_1[Y'_h+1],\ \left(\text{i.e. to}\ K_2G_1^{\frac{1}{\gamma}}[Y'_h+1]\right)$$

which are impressed on its input terminals. A number of different types of product amplifiers are known in the radio art; Fig. 2 shows one of these.

The output $$R_1^{\frac{1}{\gamma}}$$

of adding net 9 and the output $K_1[Y'_h+1]$ of adding net 12 are impressed on the input of a second product amplifier 16 to produce an output $$K_3R_1^{\frac{1}{\gamma}}[Y'_h+1]$$

and the output $$B_1^{\frac{1}{\gamma}}$$

of adding net 10 and the output $[Y'_h+1]$ of adding net 12 are impressed on the input of a third product amplifier 17 to produce an output $$K_4B_1^{\frac{1}{\gamma}}(Y'_h+1)$$

The outputs of product amplifiers 14, 16 and 17 are respectively impressed on the green-emission, red-emission and blue-emission control electrodes of color-kinescope system 15 thereby producing color images of green-light intensity $L_G=G_1(1+Y'_h)^{\gamma}$, red-light intensity $$L_R=R_1(1+Y'_h)^{\gamma}$$

and blue-light intensity $L_B=B_1(1+Y'_h)^{\gamma}$. In order that the relatively simple product amplifier of Fig. 2 may be used $K_1$ should be greater than any of $G_1$, $R_1$ and $B_1$.

It will be noted that, whether intensity variations of frequencies above one megacycle are present or not, (i.e. whether $Y'_h$ is zero or not), the light intensities $L_G$, $L_R$ and $L_B$ always bear the same ratios to each other as do the color information signals $G_1$, $R_1$ and $B_1$.

Fig. 2 shows a suitable form for the three product amplifiers 14, 16 and 17 of Fig. 1. Thus the output $K_1[Y'_h+1]$ from adding-net 12 is impressed across a resistor 21 which has one end grounded and the other end connected to the mid-taps of resistors 22, 23, 24 whose end terminals are connected respectively to the control-electrode circuits of the green, red and blue phosphor scanning beams in the kinescope system 15. The output $$G_1^{\frac{1}{\gamma}}$$

of adding-net 8 is connected through two channels 25, 26 embodying similarly poled non-linear resistors 27, 28 (which may for instance be germanium diodes) to the end terminals of resistor 22. A resistor 29 having its mid-tap grounded interconnects the channels 25, 26.

A set of channels 31, 32 similar to channels 25 and 26, are connected to the end terminals of resistor 23 and are joined by a resistor 33 having its mid-point grounded and its ends impressed with the output $$R_1^{\frac{1}{\gamma}}$$

of adding-net 9; and similar channels 34, 35 and resistor 36 connect the output $$B_1^{\frac{1}{\gamma}}$$

across the ends of resistor 24.

I claim as my invention:

1. A receiving system for producing a color television image defined by a composite signal comprising a first carrier wave having a first given frequency value, said carrier wave being amplitude modulated by a first intelligence signal indicative of the brightness detail of the elements of said image and having a first frequency spectrum extending to a given maximum frequency value, a second carrier wave having a second given frequency value and a second frequency spectrum arranged adjacent to said maximum frequency value, said second carrier wave having amplitude and phase variations establishing with said first intelligence signal the chromaticity of the elements of said image, said receiving system comprising a first transmission path for amplifying the said composite signal, first detecting means coupled to said first transmission path for producing first and second output signals, said first output signal having variations determined by said first intelligence and indicative of brightness variations of said image, and said second output signal being in the form of a modulated subcarrier wave having a subcarrier frequency equal to the difference between said first and second frequency values and defining with said first output signal the chromaticity of said image elements, a low pass filter coupled to said detecting means and adapted to transmit a first component $Y'_1$ of said first output signal selectively with respect to a second component $Y'_h$, said first component $Y'_1$ being indicative of brightness variations of said image occurring at frequencise below one megacycle, said second component $Y'_h$ being indicative of brightness variations occurring at frequencies above one megacycle, a high pass filter coupled to said detecting means and adapted to transmit said second component $Y'_h$ selectively with respect to said first component $Y'_1$, a band pass filter coupled to said detecting means and having a band pass characteristic centered about said subcarrier frequency to transmit said second output signal selectively with respect to components of said first output signal, color signal demodulator means coupled to said band pass filter and responsive to said subcarrier wave to produce first, second and third color difference signals respectively proportional to $$\left(G_1^{\frac{1}{\gamma}}-Y'_1\right), \left(R_1^{\frac{1}{\gamma}}-Y'_1\right) \text{ and } \left(B_1^{\frac{1}{\gamma}}-Y'_1\right)$$

wherein $G_1$, $R_1$ and $B_1$ are respectively indicative of green, red and blue color intensity fluctuations of said image occurring at frequencies below one megacycle and $\gamma$ is the power of the control voltage of an electron beam bombarding a luminescent screen to which brightness of said screen is proportional; first, second and third sum producers each having first and second inputs and an output with said first inputs being coupled in common to said low pass filter and said second inputs being separately coupled to said demodulator means for respectively utilizing said first, second and third color difference signals and said first component $Y'_1$ to respectively produce low frequency color intensity signals $$G_1^{\frac{1}{\gamma}}, R_1^{\frac{1}{\gamma}} \text{ and } B_1^{\frac{1}{\gamma}}$$

by adding said first component $Y'_1$ to each of said color difference signals, a fourth sum producer coupled to said high pass filter for adding a constant voltage to said second component $Y'_h$ to produce a high frequency image brightness signal $K_1(Y'_h+1)$; first, second and third signal multiplying circuits having first inputs coupled in common to said fourth sum producer and each having second inputs coupled respectively to said first, second and third sum producers for respectively multiplying said low frequency color intensity signals $$G_1^{\frac{1}{\gamma}}, R_1^{\frac{1}{\gamma}} \text{ and } B_1^{\frac{1}{\gamma}}$$

by said high frequency brightness signal $K_1(Y'_h+1)$ respectively produce first, second and third composite color signals in which variations at frequencies above one megacycle having the same ratio to each other as variations below one megacycle, color image reproducing means including first, second and third electron beams for respectively bombarding red, green and blue luminescent materials, and means for respectively applying said composite color signals to individually control said electron beams.

2. A receiving system for producing a color television image defined by a composite signal comprising a first carrier wave having a first given frequency value, said carrier wave being amplitude modulated by a first intelligence signal $Y'$ indicative of the brightness detail of the elements of said image and having a first frequency spectrum extending to a given maximum frequency value, a second carrier wave having a second given frequency value and a second frequency spectrum arranged adjacent to said maximum frequency value, said second carrier wave having amplitude and phase variations establishing with said first intelligence signal the chromaticity of the elements of said image, said receiving system comprising a first transmission path for applying the said composite signal, first detecting means connected to said first transmission path for producing first and second output signals, said first output signal having variations determined by said first intelligence and indicative of brightness variations of said image, and said second output signal being in the form of a modulated subcarrier wave having a subcarrier frequency equal to the difference between said first and second frequency values and defining with said first output signal the chromaticity of said image elements, a low pass filter connected to said detecting means and adapted to transmit a first component $Y'_1$ of said first output signal selectively with respect to a second component $Y'_h$, said first component $Y'_1$ being indicative of brightness variations of said image occurring at frequencies below one megacycle, said second component $Y'_h$ being indicative of brightness variations occurring at frequencies above one megacycle, a high pass filter connected to said detecting means and adapted to transmit said second component $Y'_h$ selectively with respect to said first component $Y'_1$, color signal demodulator means connected to said detector and responsive to said subcarrier wave to produce first, second and third color difference signals respectively proportional to $$\left(G_1^{\frac{1}{\gamma}}-Y'_1\right), \left(R_1^{\frac{1}{\gamma}}-Y'_1\right) \text{ and } \left(B_1^{\frac{1}{\gamma}}-Y'_1\right)$$

wherein $G_1$, $R_1$ and $B_1$ are respectively indicative of green, red and blue color intensity fluctuations of said image occurring at frequencies below one megacycle and $\gamma$ is the power of the control voltage of an electron beam bombarding a luminescent screen to which brightness of said screen is proportional; first, second and third sum producers each having first and second inputs and an output with said first inputs being connected in common to said low pass filter and said second inputs being separately connected to said demodulator means for respectively utilizing said first, second and third color difference signals and said first component $Y'_1$ to respectively produce low frequency color intensity signals $$G_1^{\frac{1}{\gamma}},\ R_1^{\frac{1}{\gamma}} \text{ and } B_1^{\frac{1}{\gamma}}$$

by adding said first component $Y'_1$ to each of said color difference signals; a fourth sum producer connected to said high pass filter for adding a constant voltage to said second component $Y'_h$ to produce a high frequency image brightness signal $K_1(Y'_h+1)$; first, second and third signal multiplying circuits having first inputs connected in common to said fourth sum prdoucer and each having second inputs connected respectively to said first, second and third sum producers for respectively multiplying said low frequency color intensity signals $$G_1^{\frac{1}{\gamma}},\ R_1^{\frac{1}{\gamma}} \text{ and } B_1^{\frac{1}{\gamma}}$$

by said high frequency brightness signal $K_1(Y'_h+1)$ to respectively produce first, second and third composite color signals in which variations at frequencies above one megacycle have the same ratio to each other as variations below one megacycle; color image reproducing means including first, second and third electron beams for respectively bombarding red, green and blue luminescent materials, and means for respectively applying said composite color signals to individually control said electron beams.

References Cited in the file of this patent

UNITED STATES PATENTS

| | | |
|---|---|---|
| 2,680,147 | Rhodes | June 1, 1954 |
| 2,734,310 | Schroeder | Apr. 24, 1956 |
| 2,745,900 | Parker | May 15, 1956 |
| 2,754,356 | Espenlaub | July 10, 1956 |
| 2,779,818 | Adler | Jan. 29, 1957 |

OTHER REFERENCES

Principles of NTSC Compatible Color Television, Electronics, February 1952, Hirsch, Bailey and Loughlin, pages 88 to 95.

NTSC Color TV, Dome, Electronics, February 1952, pages 96 and 97.

Two-Color Receiver for RCA Color Television System, November 1949, pages 1 to 15.

Principles of NTSC, Hirsch, Electronics, February 1952.

Introduction to Color Television, Admiral Corp., February 1954, Chicago, Ill.